United States Patent [19]

Patrick

[11] Patent Number: 5,566,347

[45] Date of Patent: Oct. 15, 1996

[54] MULTIPLE INTERFACE DRIVER CIRCUIT FOR A PERIPHERAL STORAGE DEVICE

[75] Inventor: Edward H. Patrick, Westminster, Calif.

[73] Assignee: Conner Peripherals, Inc., San Jose, Calif.

[21] Appl. No.: 950,939

[22] Filed: Sep. 24, 1992

[51] Int. Cl.$^6$ ............................ H04L 12/28; H04L 12/40; H01R 9/09

[52] U.S. Cl. ............... 395/831; 340/825.83; 340/825.03; 395/200.01; 395/200.02; 395/200.06; 395/827; 395/830; 439/59; 439/75

[58] Field of Search ....................... 395/275, 200; 364/DIG. 1, DIG. 2; 307/443, 475; 340/172.5, 825.83, 825.03; 439/59,75

[56] References Cited

U.S. PATENT DOCUMENTS

| | | | |
|---|---|---|---|
| 3,846,763 | 11/1974 | Riikonen | 340/172.5 |
| 4,790,762 | 12/1988 | Harms et al. | 439/59 |
| 4,936,785 | 6/1990 | Krug et al. | 439/75 |
| 4,984,202 | 1/1991 | Kawahara et al. | 365/177 |
| 5,027,315 | 6/1991 | Agrawal et al. | 395/200 |
| 5,036,224 | 7/1991 | Wendell | 307/475 |
| 5,043,938 | 8/1991 | Ebersole | 364/900 |

*Primary Examiner*—Gail O. Hayes
*Assistant Examiner*—Felicia A. Ives
*Attorney, Agent, or Firm*—Fliesler, Dubb, Meyer & Lovejoy LLP

[57] ABSTRACT

A multiple interface driver circuit for transmitting data in a channel according to one of several different signal protocols. In the exemplary embodiment, two separate bus driver circuits are connected to a common output terminal and may be selected under software control. When one such driver is selected, the other remains in an inactive state, presenting a high output impedance to the driver signal from the other. In an alternative embodiment, one interface driver circuit is connected to the output terminal and the driver circuit output signal is either left unchanged or modified under software control by a second pullup driver circuit. The unconditioned output signal conforms to a first interface protocol. After conditioning by the second pullup driver circuit, the output signal conforms to a second interface protocol.

16 Claims, 3 Drawing Sheets

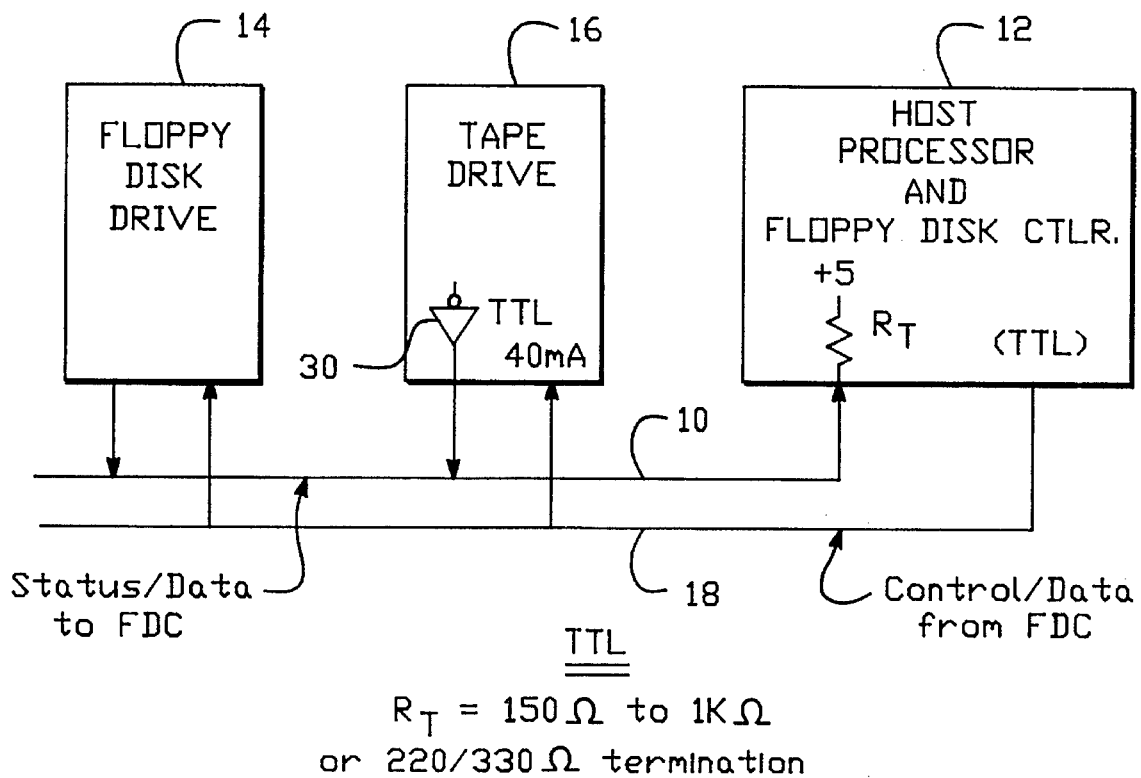
FIG. 1A
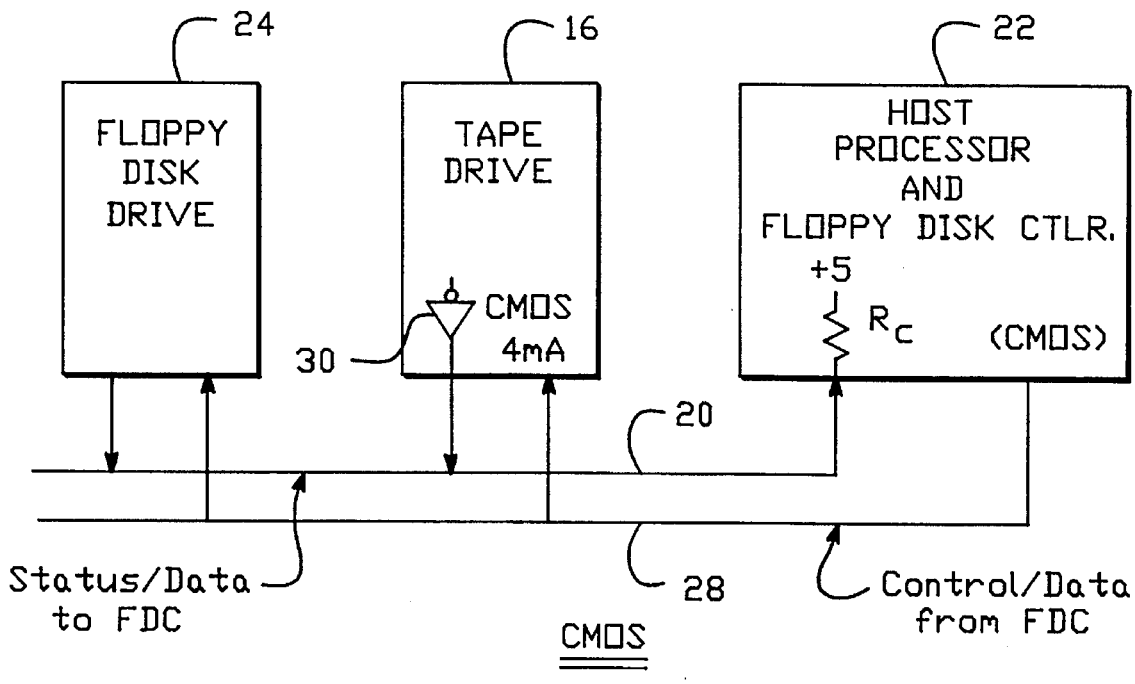

| SPECIFICATION | QIC-117-I | QIC-117-II |
|---|---|---|
| CONFIGURATION | OPEN COLLECTOR | TRI-STATE |
| INPUT HYSTERESIS | 800mV | 650mV |
| INPUT LOGIC LEVEL | 1.2v | 1.3V |
| ACTIVE OUTPUT CURRENT | 40mA | 4mA |
| INACTIVE INPUT LEVEL | 2.0 to 5.25V | 2.5 to 5.25V |
| ACTIVE INPUT LEVEL | 0 to 0.8V | 0 to 0.4V |
| INACTIVE OUTPUT LEVEL | 3.7 to 5.25V | 2.5 to 5.25V |
| ACTIVE OUTPUT LEVEL | 0 to 0.4V | 0 to 0.4V |
| PHYSICAL INTERFACE | 34 pins | 40 pins |

FIG. 2

MULTIPLE INTERFACE DRIVER CIRCUIT FOR A PERIPHERAL STORAGE DEVICE

BACKGROUND OF THE INVENTION

1. Field of the Invention

This invention relates generally to interface driver circuitry in a data channel and, more specifically, to a single interface driver useful for two different interface signal protocols.

2. Discussion of the Related Art

In the personal computer art, a substantial market exists for devices and circuits manufactured by others for add-on to existing computer systems. For example, a number of manufacturers produce peripheral storage devices of one kind or another, such as streaming tape drives, external disk drives, optical data storage devices and the like. Most modern personal computer systems provide for connection to such peripheral storage devices, but several different electrical and mechanical interface standards have been established in the industry.

This variety of interface standards or protocols presents a practical problem to the personal computer system user as well as the peripheral storage device manufacturer. For example, interface protocols established for use with IBM personal computers differ completely from those used in the Apple Macintosh. Even for computers within the IBM personal computer family, the Quarter-Inch Cartridge Committee (QIC) has established several bus protocols. For instance, QIC-117 specifies an "AT" signal interface designed for open-collector operation and a "PS2" tri-state interface designed for Complimentary Metal-Oxide-Semiconductor (CMOS) operation. The open-collector signal interface must sink 40 mA instead of the 4.0 mA current sinking required in the tri-state signal interface. Equally substantial differences in signal hysteresis and channel capacitance exist between these two IBM interface protocols.

The accepted solution to this problem is for peripheral storage device manufacturers to create a different device model for each such interface protocol. This approach has several keenly-felt disadvantages, including the economic costs of product model multiplicity, the user inconvenience of selecting the proper device model for a particular computer system, and rapid obsolescence of peripheral devices over time with evolving technology.

Practitioners in the art have proposed solutions to this problem. For instance, in U.S. Pat. No. 4,936,785, Eric M. Krug et al propose an interchangeable adapter module that adapts a peripheral storage device interface card to several different signal interface protocols. Krug et al provide a "uniform" interface through the use of a small interchangeable adapter module or "daughter-board" that is mounted on the primary interface circuit board ("mother-board") to complete the interface circuit. Thus, Krug et al propose keeping an inventory of small daughter-boards to avoid the need for a number of larger and more expensive boards. While this reduces the economic costs of product model multiplicity, it does little to address the prospective user and manufacturer inconvenience and confusion.

Ideally, at least for single-manufacturer computer lines, the outside peripheral storage device manufacturer would offer a single interface circuit suitable for immediate connection to any computer in the line; i.e., for example, a single interface for both the AT and the PS2 device ports. This is a problem of particular importance for streaming tape drives, which are intended for direct substitution at disk drive ports, because the tape drive interface must be indistinguishable from the disk drive interface expected at the computer port. The related unresolved problems and deficiencies are clearly felt in the art and are solved by this invention in the manner described below.

SUMMARY OF THE INVENTION

This invention provides a single driver output signal interface circuit for several different interface standards or protocols. The object of this invention is to provide a single circuit for driving several different buses, each bus having a different hardware protocol, without hardware modification.

It is an object of this invention that the peripheral storage device manufacturer must manufacture and stock only a single device design for two or more different electrical interface protocols. It is an advantage of this invention that the interface driver circuit can be conditioned for either of two or more interface protocols under software control. It is yet another advantage of this invention that the multiple interface driver circuit can be entirely implemented in a single monolithic integrated circuit embodiment.

The foregoing, together with other objects, features and advantages of this invention, will become more apparent when referring to the following specification, claims, and the accompanying drawing.

BRIEF DESCRIPTION OF THE DRAWING

For a more complete understanding of this invention, reference is now made to the following detailed description of the embodiments as illustrated in the accompanying drawing, wherein:

FIGS. 1A and 1B are functional block diagrams of two QIC-117 hardware bus standards and a peripheral device using the circuit of this invention from FIG. 3;

FIG. 2 is a chart comparing the two exemplary bus interface protocols illustrated in FIGS. 1A and 1B;

DESCRIPTION OF THE PREFERRED EMBODIMENTS

Figure 3:
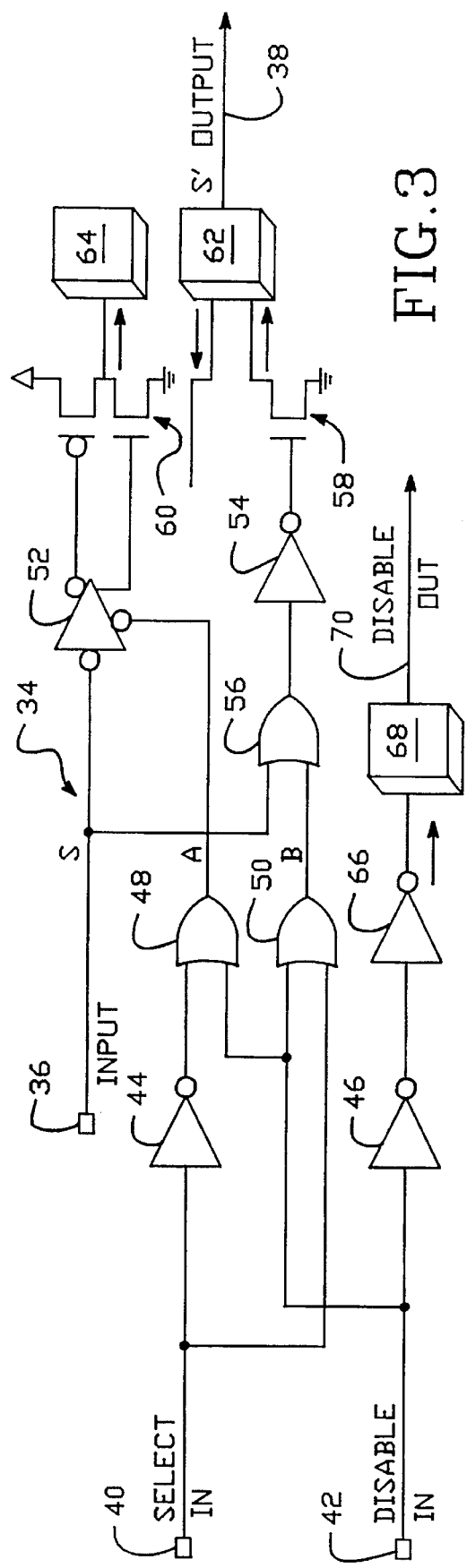
FIG. 3 is a functional circuit diagram of an illustrative embodiment of a dual interface driver circuit of this invention.

FIGS. 1A and 1B show two QIC-117 bus interface standards relevant to the illustrative dual interface driver circuit of this invention. These are the open collector TTL standard (FIG. 1A) and the tri-state CMOS standard (FIG. 1B), both further compared in FIG. 2. In FIG. 1A, the host processor input bus 10 interconnects the host processor 12, a floppy disk drive 14, a tape drive 16 and a plurality of other peripherals (not shown). These elements are also interconnected through a host processor output bus 18. Similarly, in FIG. 1B, a host processor CMOS input bus 20 interconnects host processor 22, a floppy disk drive 24, tape drive 16 and a plurality of other peripheral devices (not shown). These elements are also interconnected by a host processor output bus 28.

Referring to FIG. 2, note that the primary distinctions between the open collector TTL and tri-state CMOS bus standards are the active output current requirements and the input signal hysteresis specification. In FIG. 1A, the TTL bus terminating resistor $R_t$ is substantially different from the equivalent CMOS bus terminating resistor $R_c$ in FIG. 1B. These differences reflect the different current-sinking requirements specified for the two exemplary bus protocols.

A dual interface driver circuit 30 of this invention is installed typically at the output of tape drive 16 as shown in FIGS. 1A and 1B. Dual interface driver 30 permits tape drive 16 to be connected to either bus 10 in FIG. 1A or bus 20 in FIG. 1B without physical modification. Such is not the case for floppy disk drives 14 or 24 or any other peripheral devices known in the art.

FIG. 3 shows an illustrative embodiment of an exemplary dual interface driver 34 of this invention. It is preferably fabricated as a single monolithic integrated circuit. In operation, driver 34 in FIG. 3 accepts an input data signal at an input terminal 36. The input data signal is a two-valued binary signal S, which is replicated at the output terminal 38 in modified form S'. That is, the voltage and current characteristics (source impedance) of signal S' at output terminal 38 is modified with respect to the same characteristics of signal S at input terminal 36.

The two exemplary interface protocols of driver 34 in FIG. 3 are selected by a selection signal at an interface select terminal 40. Also, the output S' at output terminal 38 can be disabled by a disable signal at output disable terminal 42. Signals 40 and 42 are buffered by the inverters 44 and 46 and combined by the OR-gates 48 and 50 to create signals A and B according the following logic:

A=disable or not select

B=disable or select

Finally, the gated inverter 52, the inverter 54 and the OR-gate 56 combine input signal S with signals A and B at the gate terminals of the MOSFETs 58 and 60. The gate signal on MOSFET 58 is equal to input signal S unless signal B is high, which overrides S and forces MOSFET 58 off. Similarly, the gate signals on Complimentary MOSFET 60 are equal to input signal S unless signal A is high, which then overrides S and forces MOSFET 60 off. Thus, it can be readily appreciated that holding interface selection terminal 40 high forces signal B high, thereby forcing MOSFET 58 off and disabling the output signal protocol associated with the pad 62. Similarly, holding interface selection terminal 40 low forces signal A high, which forces MOSFET 60 off, thereby disabling the output signal protocol associated with the pad 64. The inverter 66, inverter 46 and the pad 68 merely buffer the signal at output disable terminal 42, which may then be presented on the line 70 to succeeding stages (not shown).

In summary, dual interface driver 34 provides two output signal protocols associated with the source impedances provided in pads 62 and 64. A high binary signal at output disable terminal 42 disables both such protocols. A low binary signal at interface selection terminal 40 disables the protocol associated with pad 64 and a high binary signal at terminal 40 disables the other protocol associated with pad 62. A multiple interface driver for more than two interfaces (not shown) can be understood as an extension of dual driver 34 to several interface protocols, each having signal means for disabling the protocol when it is not needed.

Figure 4:
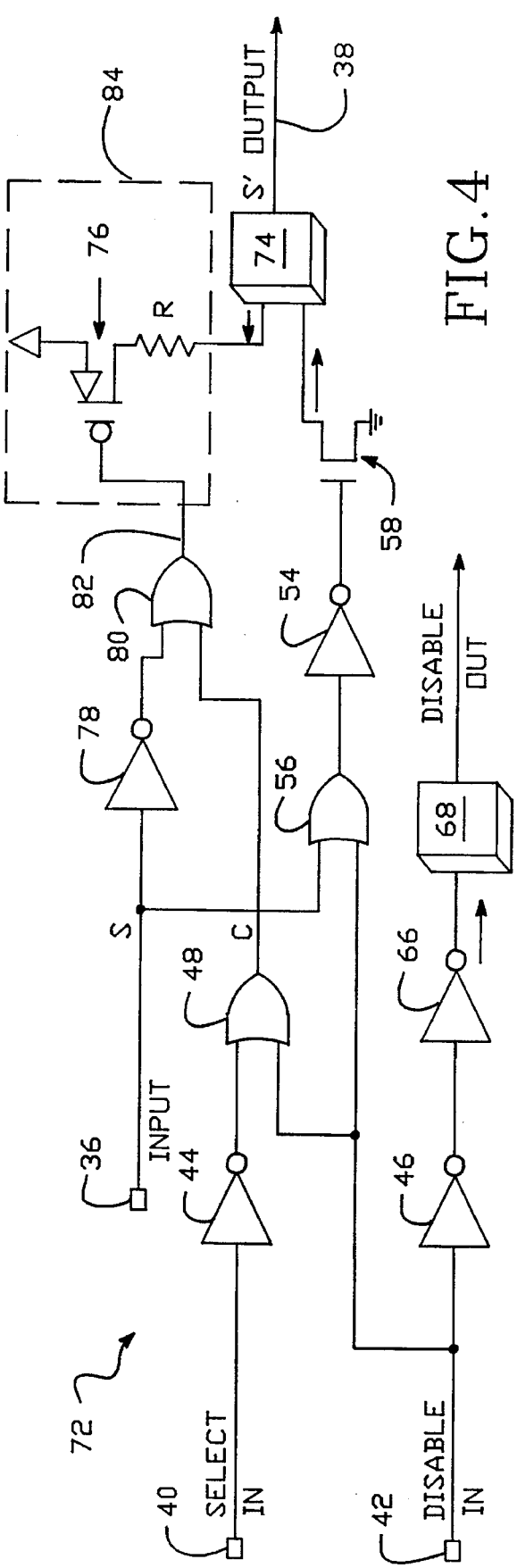
FIG. 4 is a functional circuit diagram of an alternative embodiment of a dual interface driver circuit of this invention.

An alternative embodiment 72 of a dual interface driver circuit of this invention is shown in FIG. 4. The essential feature of dual interface driver circuit 72 is that only one output signal protocol is supplied; that one associated with the pad 74. The single protocol can be modified by switching in an external pullup resistor R selected to modify the protocol in pad 74 as desired. Although not shown in FIG. 4, pullup resistor R can be selected by external means from a plurality of such resistors each representing one of several protocols. However, the open collector drive capability of MOSFET 76 must be sufficient to drive both the signal terminating pullup resistor (not shown) and the selected local pullup resistor R.

In operation, dual driver 72 operates similarly to dual driver 34 in FIG. 3. The signals at interface selection terminal 40 and output disable terminal 42 are buffered in inverters 44 and 46 and combined in OR-gate 48 to create the signal C according to the following logic:

C=disable or not select

The inverter 78 and the OR-gate 80 combine input signal S and signal C to produce a signal at the line 82 that forces MOSFET 76 off whenever signal C is high. Thus, a high value for signal C removes the external pullup network 84 from the circuit, forcing selection of the protocol associated with pad 74. Likewise, when signal C is low, pullup network 84 is added to the dual driver circuit 72, modifying the protocol associated with pad 74 in a manner that depends on the value of pullup resistor R.

Thus, it can be appreciated that when interface selection terminal 40 is low, external pullup network 84 is disabled. When terminal 40 is high, external pullup network 84 is added to modify the protocol associated with pad 74. When output disable terminal 42 is high, MOSFET 58 is forced off, thereby disabling the S' output at output terminal 38. Any of several protocols may be matched by selecting one of several pullup resistors provided by external means.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A data signal multiple output interface circuit comprising:

input means for accepting a data signal;

output terminal means for delivering a modified version of said data signal to an external electronic circuit;

first peripheral storage driver means, connected to said input means and said output terminal means, for generating said modified version of said data signal according to a first peripheral storage protocol, said first peripheral storage driver means having an inactive state wherein said modified version of said data signal is substantially zero;

at least one second peripheral storage driver means, connected to said input means and said output terminal means, for generating said modified version of said data signal according to at least one corresponding second peripheral storage protocol, said at least one second peripheral storage driver means having an inactive state wherein the corresponding said modified version of said data signal is substantially zero; and selection means, coupled to said first peripheral storage driver means and said at least one second peripheral storage driver means, for selecting said inactive state for said first and said at least one second peripheral storage driver means, wherein said modified version of said data signal corresponds to said peripheral storage protocol of said selected driver means.

2. The multiple output interface circuit of claim 1 further comprising:

output enablement means, coupled to said first and said at least one second peripheral storage driver means, for disconnecting said input means from said first and said at least one second peripheral storage driver means.

3. The multiple output interface circuit of claim 1 wherein:

said input means, said first and second peripheral storage driver means and said selection means are disposed in a single monolithic integrated circuit.

4. A data signal multiple output interface circuit comprising:

input means for accepting a data signal;

output terminal means for delivering a modified version of said data signal to an external electronic circuit;

first peripheral storage driver means, connected between said input means and said output terminal means, for generating said modified version of said data signal by conditioning a voltage and current of said data signal according to a first peripheral storage protocol; and at least one post-driver pullup means, connected to said output terminal means, for generating said modified version of said data signal by conditioning said voltage and current according to at least one corresponding second peripheral storage protocol.

5. The multiple output interface circuit of claim 4 further comprising:

selection means, coupled to each said post-driver pullup means, for generating a select signal, wherein operation of the corresponding said post-driver pullup means is responsive to said select signal.

6. The multiple output interface circuit of claim 4 wherein:

said input means, said first peripheral storage driver means and said post-driver pullup means are all disposed on a single monolithic integrated circuit.

7. In a data storage tape drive, a multiple data bus interface circuit comprising:

input means for accepting a data signal;

output terminal means for delivering a modified version of said data signal to an external electronic circuit;

first peripheral storage driver means, connected to said input means and said output terminal means, for generating said modified version of said data signal according to a first peripheral storage protocol, said first peripheral storage driver means having an inactive state wherein said modified version of said data signal is substantially zero;

at least one second peripheral storage driver means, connected to said input means and said output terminal means, for generating said modified version of said data signal according to at least one corresponding second peripheral storage protocol, said at least one second peripheral storage driver means having an inactive state wherein the corresponding said modified version of said data signal is substantially zero; and selection means, coupled to said first peripheral storage driver means and said at least one second peripheral storage driver means, for selecting said inactive state for said first and said at least one second peripheral storage driver means, wherein said modified data signal corresponds to said protocol of said selected peripheral storage driver means.

8. The multiple interface circuit of claim 7 further comprising:

output enablement means, coupled to said first peripheral storage driver means and said at least one second peripheral storage driver means, for disconnecting said input means from said first and at least one said second peripheral storage driver means.

9. In a data storage tape drive, a multiple data bus interface circuit comprising:

input means for accepting a data signal;

output terminal means for delivering a modified version of said data signal to an external electronic circuit;

first peripheral storage driver means, connected between said input means and said output terminal means, for generating said modified version of said data signal by conditioning a voltage and current of said data signal according to a first peripheral storage protocol; and at least one post-driver pullup means, connected to said output terminal means, for generating said modified version of said data signal by conditioning said voltage and current according to at least one corresponding second peripheral storage protocol.

10. The multiple interface circuit of claim 9 further comprising:

selection means, coupled to each said at least one post-driver pullup means, for generating a select signal, wherein operation of the corresponding said post-driver pullup means is responsive to said select signal.

11. A multiple output interface circuit, comprising:

an input terminal operative to carry a data signal, an output terminal operative to deliver a modified data signal to an external device;

a first peripheral storage driver connected between said input terminal and said output terminal, said first peripheral storage driver responsive to generate said modified data signal corresponding to a first peripheral storage protocol;

a second peripheral storage driver connected between said input terminal and said output terminal, said second peripheral storage driver responsive to generate said modified data signal corresponding to a second peripheral storage protocol; and selection circuitry coupled to said first peripheral storage driver and said second peripheral storage driver operative to select an inactive state for said first and second peripheral storage drivers, wherein said modified data signal corresponds to said peripheral storage protocol of said selected driver.

12. The circuit of claim 11, wherein said first peripheral storage driver further comprises:

a first transistor responsive to said selection circuitry; and an impedance pad which conditions said data signal corresponding to a first peripheral storage protocol.

13. The circuit of claim 12, wherein said second peripheral storage driver further comprises:

a second transistor responsive to said selection circuitry; and an impedance pad which conditions said data signal corresponding to a second peripheral storage protocol.

14. The circuit of claim 13, wherein said second selection transistor is a CMOS transistor.

15. The circuit of claim 11, wherein said second peripheral storage driver further comprises a pullup network responsive to said selection circuitry and said data signal.

16. The circuit of claim 14, wherein said selection circuitry further comprises a plurality of logic gates, coupled to a selection terminal and said data signal, operative to generate a selection signal to enable said first and second transistors corresponding to said selection terminal.

* * * * *